Jan. 9, 1934.   J. L. ADAMS, JR   1,942,466
TUBE FORMING MACHINE
Filed Aug. 7, 1928   2 Sheets-Sheet 1
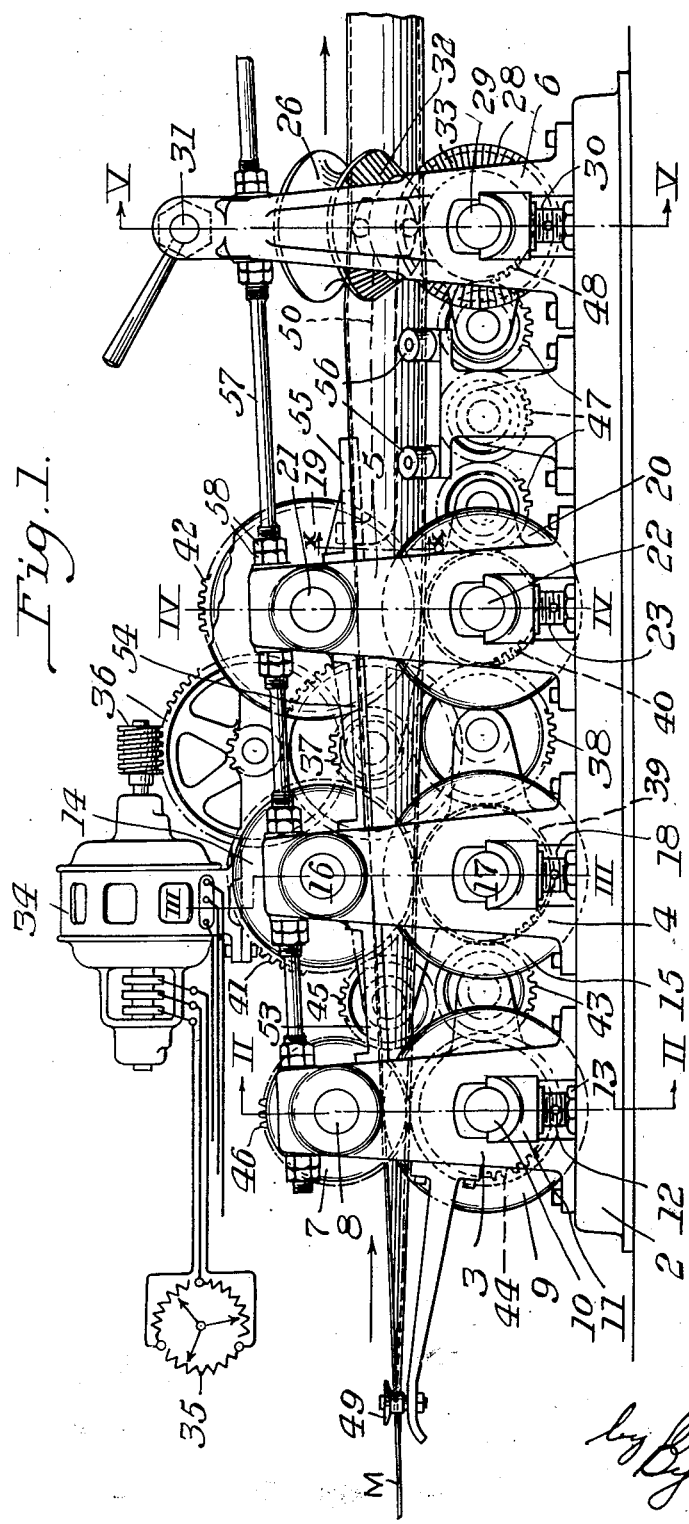
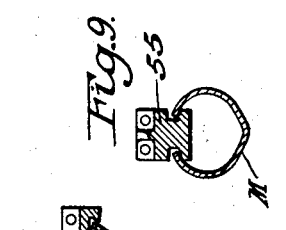
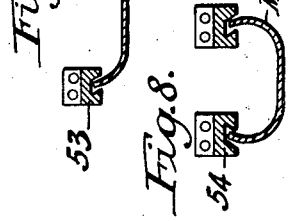
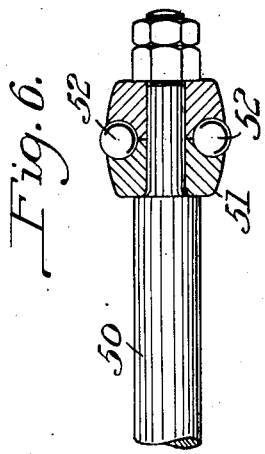
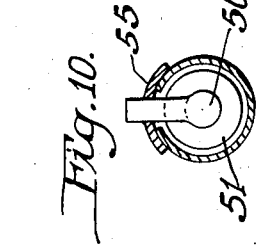
INVENTOR
James L. Adams Jr.
by Byrnes, Stebbins & Parmelee
his attorneys Jan. 9, 1934.      J. L. ADAMS, JR      1,942,466
TUBE FORMING MACHINE
Filed Aug. 7, 1928        2 Sheets-Sheet 2
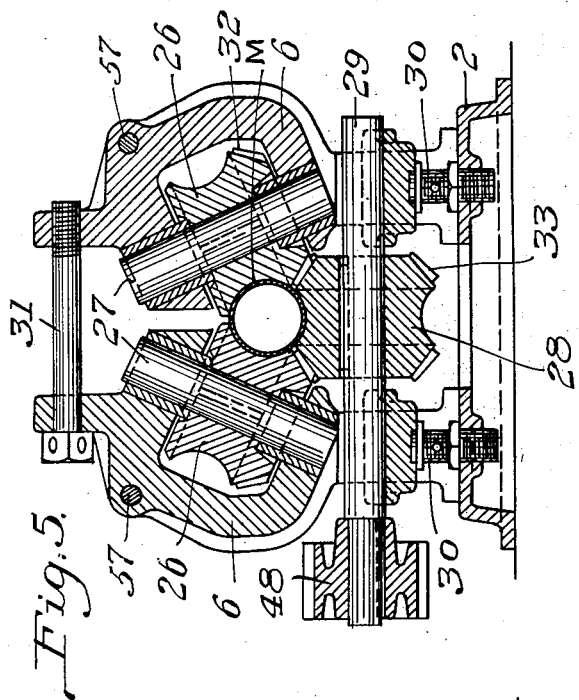
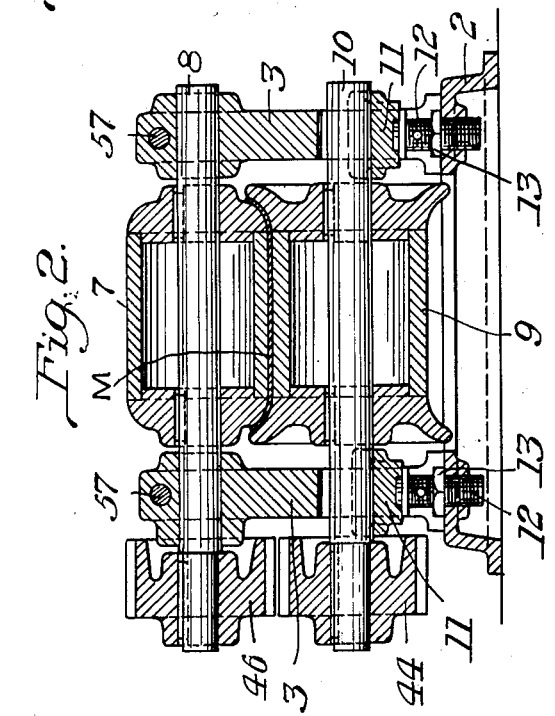
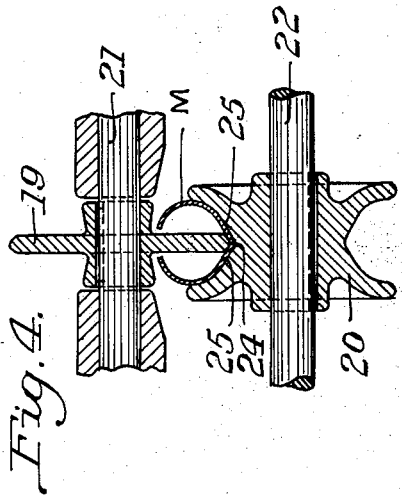
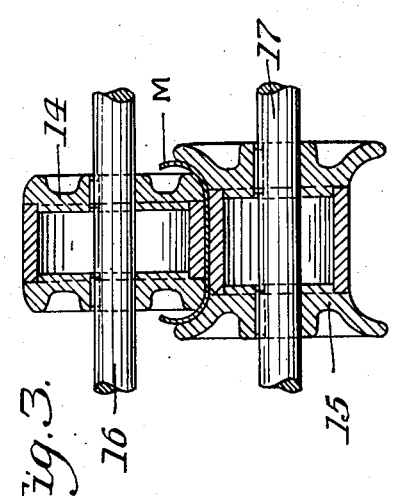

Patented Jan. 9, 1934

1,942,466

UNITED STATES PATENT OFFICE 1,942,466

TUBE FORMING MACHINE

James L. Adams, Jr., Youngstown, Ohio, assignor to The Youngstown Sheet & Tube Company, a corporation of Ohio Application August 7, 1928. Serial No. 297,963

7 Claims. (Cl. 153—54)

The present invention relates broadly to the art of metal working and more particularly to the bending and shaping of metal for the formation of tubes therefrom. The term tubes is herein utilized in its generic sense, and is definitive of pipes, conduits, tubes and the like, irrespective of the construction thereof or the purposes to which they are to be put.

The invention while particularly adapted to the forming up cold from fairly long lengths of plate or strip of fairly heavy stock, is not limited thereto, the invention being adaptable to the forming up hot of any desired material, and to the handling and forming of material either hot or cold irrespective of the length thereof.

One of the objects of the present invention is to longitudinally fold up one or a succession of metal plates or strips into approximately true circular form, having a comparatively narrow seam line preparatory to the subsequent closure of such seam by a suitable welding operation, or for one so formed, but where welding is not desired.

In accordance with the present invention the lengths of the formed tubes are limited solely by the length of plate or strip obtainable at a favorable price, or by shipping considerations, and not at all by the machine itself or by the usual furnace requirements such as ordinarily govern manufacturing conditions, and particularly with respect to tubes of relatively larger diameters.

Such furnaces, where utilized, have also prevented the construction of a truly portable tube forming plant on account of the difficulties incident to effecting removal and setting up thereof. In accordance with the present invention the necessity for the use of such furnaces is obviated so that a truly portable apparatus is provided. By reason of this construction, a manufacturer is afforded the choice either of setting up the apparatus and bringing the plate or strip thereto, or of moving the apparatus itself from one location to another as manufacturing and most favorable freight conditions may dictate.

At the present time an eastern or middle western pipe mill cannot successfully compete with manufacturers on the West Coast, for example, where deliveries are to be made in such coastal region. With an apparatus of the character herein contemplated, if a contract is of sufficient size, a portable plant can be put on the ground at small expense regardless of where it may previously have been used, the total weight of the plant being an almost insignificant percentage of the total weight of the product required by any usual sized contract.

Furthermore, the larger pipe sizes used in trunk lines require expensive couplings at each joint. A continuous process of pipe formation permits the ready production of far longer lengths of pipe sections than the present day methods of hot forming requiring a furnace. A portable plant further permits the ready delivery of such longer lengths, since with the forming machine adjacent the point of delivery the finished sections have to be shipped but a short average distance to reach their final destination.

The production of longer sections further materially reduces the number of couplings required for the connecting thereof. This not only materially reduces the total cost of a trunk line installation, for example, but minimizes the possibility of leakage, since almost invariably where leaks develop they are located in the coupling means and not in the seams in the sections themseves. For pipe sizes up to sixteen inches, for example, the necessary plates can be obtained as cheaply in eighty foot lengths as in shorter lengths, the longer plates being easily doubled back on themselves during shipment so that a single car may effectively carry the same.

It has heretofore been proposed in the art to which the invention relates, to utilize roller systems for the forming up of pipe or tube from sheets, but the present invention possesses the advantage not only of adapting itself to continuous, or substantially continuous, forming up operations, but also of forming an approximately true circular product in which the seam lips are firmly pressed together. This is extremely important from the standpoint of after operations performed thereon, such, for example, as arc welding, dip brazing, and the like.

In the accompanying drawings I have shown by way of illustration only, one embodiment of the present invention, it being understood that the drawings do not define the limits of my invention as changes in construction, operation, and relationship of the parts may be made without departing either from the spirit of the invention or the scope of my broader claims.

In the drawings:—

Figure 1 is a side elevational view of one form of apparatus in accordanace with the present invention;

Figure 2 is a transverse sectional view on the line II—II of Figure 1, looking in the direction of the arrows;

Figure 3 is a transverse sectional view through a portion of the apparatus on the line III—III of Figure 1, looking in the direction of the arrows;

Figure 4 is a view similar to Figure 3, but taken on the line IV—IV of Figure 1;

Figure 5 is a view similar to Figure 2, but taken along the line V—V of Figure 1; looking in the direction of the arrows;

Figure 6 is a detail view, on an enlarged scale, of a portion of the apparatus;

Figure 7 is a partial sectional view taken between the first and second forming roll stands;

Figure 8 is a similar view taken between the second and third roll stands;

Figure 9 is a similar view taken just beyond the third forming roll stand; and

Figure 10 is a detail sectional view through a portion of the apparatus taken on the line X—X of Figure 1, and looking in the direction of the arrows.

In accordance with the present invention there may be provided a suitable forming apparatus comprising a base 2, having mounted thereon in spaced relationship a series of roll stands 3, 4, 5, and 6, adapted to perform successive operations on the material M delivered thereto.

In Figure 2 there is illustrated the construction of the stand 3, showing an upper forming roll 7, carried by a shaft 8, and a lower forming roll 9, secured to the shaft 10. The upper shaft 8 is conveniently mounted in fixed bearings in the housing 3, while the lower shaft 10 is carried in bearings 11, adapted to be vertically adjusted by means of screws 12, which screws may be held in adjusted position by lock nuts 13.

The contour of the forming rolls 7 and 9 is preferably such that the material M passing between the same is bent up at each of the edges, as clearly shown in Figure 2, to an extent sufficient for each edge to form approximately 60° to 75° of the desired contour of the finished circle.

After leaving the preliminary forming rolls 7 and 9, the material passes between secondary forming rolls 14 and 15 in the roll stand 4, the upper roll 14 being mounted on a shaft 16 supported similarly to the shaft 8 and the lower roll being supported on a shaft 17, carried by adjusting screws 18 similar to the screws 12 already described. The contour of the rolls 14 and 15 is preferably such that the bending up operation on each edge of the material is substantially doubled, whereby the two edges are so shaped as to form a total from approximately 240° to 300° of the final pipe perimeter.

The material upon leaving the secondary forming rolls passes between the shaping elements 19 and 20 of the roll stand 5. The element 19 is preferably in the form of a disk secured to a shaft 21, mounted in the housing of the stand 5, while the shaping element 20 is in the form of a roll having a peripheral groove of non-circular cross section formed therein, this element being secured to a shaft 22 adapted to be adjusted toward or away from the element 19 through the medium of screws 23.

In passing between the elements 19 and 20, the bottom portion of the material M is bent to substantially V-shape to provide a rounded hump 24 thereon, the sides 25 of the hump being left substantially flat and substantially tangent to the sides of the hump and the end portions of the periphery of the tube so far formed up. The edge portions of the material are also further bent up into substantially adjacent relationship, as indicated in Figure 4 of the drawings, preparatory to the final shaping operation in the roll stand 6.

This final shaping roll stand is illustrated in detail in Figure 5, and conveniently comprises a pair of upper shaping rollers 26, mounted on angularly extending shafts 27, suitably journaled in the housing. Cooperating with the rolls 26 is a lower roll 28, supported on a shaft 29, similar to the shafts 10, 17 and 22, and adapted to be adjusted by means of the screws 30. The upper sides of the housing 6 may be connected by means of a screw 31, by which the housing sections may be slightly drawn together or separated to thereby effect any desired slight adjustment of the rolls 26. The rolls 26 may also be formed with teeth 32, adapted to mesh with teeth 33, formed on the lower roll 28, so that the three rolls are driven in synchronism.

Each of the rolls 26 and the roll 28 is preferably provided with a forming groove of almost truly arcuate cross section in the periphery thereof, adapted to so bend the material as to leave it eventually in truly circular shape, after allowing for such "spring-back" effects as invariably occur here.

The groove in the roll 28, due to its cross sectional shape, acts upon the rounded hump 24 formed by the shaping elements 19 and 20 and presses the metal of the hump upwardly to the extent required to form the cylindrical periphery of the tube. Due to this pressing-up operation which is exerted almost entirely on the hump portion itself, the tube upon leaving the last stand of rolls has its edges held firmly in engagement, due to the tendency of that portion of the metal which previously formed the hump to return toward its original position. This urging of the meeting edges into engagement is particularly important where the tube is subsequently to be dip-brazed or welded under such conditions that it can not be effectively clamped during the welding or brazing operation.

In order to drive all of the rolls of the various stands synchronously, I may provide a motor 34, of any desired construction, but preferably of the variable speed type, adapted to have its speed controlled through a suitable regulating means 35. The motor is operative through reduction gearing 36, for driving pinion 37, meshing with gear 38. The gear 38 in turn meshes with a gear 39 on the shaft 17 and with a gear 40 on the shaft 22. The pinion 37 in turn meshes with a gear 41 on the shaft 16 and with a gear 42 on the shaft 21.

The preliminary forming roll 9 is driven from the gear 39 by an idler gear 43, meshing therewith on one side and with a gear 44, secured to the shaft 10 on the opposite side. The roll 7 is similarly driven from the gears 41 and 43, through an idler 45, meshing with a gear 46 on the shaft 8, as well as with the idler 43, just above mentioned.

It will be noted that the upper and lower gears on stands 3, 4 and 5, do not directly mesh together, the side-feed from the intermediate idler being used in preference, so as to permit some vertical adjustment of the lower rolls in each case, without affecting gear centre distances here.

The shaft 29 of the roll stand 6 may be driven in any desired manner, as by a gear train 47, driven by the gear 40 and meshing with gear 48 on one end of the shaft 29.

It will be apparent that the pitch diameters of the various gears may be selected to give the desired surface speeds to the respective forming rolls and elements whereby the best results are obtained.

For accurately guiding the material into the pass of the preliminary forming rolls 7 and 9, I may provide edge rolls 49 cooperating therewith and serving to center the material in its passage between the same.

If desired, I may provide the roll pass in the final roll stand with internal forming means of the character illustrated more particularly in Figure 6, or its substantial equivalent, in which the rod 50, suitably brought back and attached to any convenient portion of the stationary elements, as the stands 4, or 5, is illustrated as provided on its outer end within the roll pass with a means 51, preferably comprising a hollow high speed steel or hardened plug of any desired construction, although I may use a plug comprising undercut sections adapted to cooperate with graphited free rolls 52 which together have an outside diameter about equal to the inside diameter of the finished pipe. In Figure 1 the rod 50 is shown as attached to and carried by one of the guiding means 55, hereinafter referred to, the structure being illustrated in detail in Figure 7.

While the apparatus so far described constitutes an operative structure by means of which material can be continuously bent up into the desired form, or by means of which successive lengths of material may be handled to form tubes therefrom, it is desirable to provide means between the roll passes of the successive rolls for automatically guiding material from one stand to the next.

For this purpose there may be provided intermediate the roll stands 3 and 4 guiding channels 53 or other equivalent means, adapted to cooperate with the edges of the material for delivering the same in proper manner to the rolls 14 and 15. In like manner there may be provided channels 54 or equivalent guiding means intermediate the roll stands 4 and 5 functioning in the same manner. Between the roll stands 5 and 6 are other guiding means 55, with which may cooperate rolls or other supporting means 56 adapted to maintain the shaped material in cooperative relation to such guiding means. Similar, or other rolls may, if desired, be located between roll-stands 3 and 4, and 4 and 5, respectively. In this manner, the apparatus is adapted to automatically guide successive lengths of material into the exact position desired relative to the forming rolls of the successive stands. This adapts it to the quantity production of accurately formed tubular products with a minimum number of handling operations.

The several roll stands having been secured to the base in the relative positions desired, they may be bolted in these positions and further held against movement relative to each other by means of tie rods 57, cooperating with the housings of the respective roll stands and held in position relative thereto by means of nuts and locknuts 58.

If it is desired to utilize the forming unit herein described in connection with a welding apparatus, such, for example, as shown in my copending application, Serial No. 297,962, filed of even date herewith, the rods 57 may be extended as indicated in Figure 1 so as to tie the forming unit and the welding unit together. In case the welding apparatus is of such nature that it is desirable to have the tube edges in slightly spaced relationship during at least a portion of the heating up operation, the roll stand 6 may be omitted from the forming unit and placed on the discharge end of the welding unit. In that case, after the edges of the tube have been welded together, the straightening action exerted on the hump will be such as to urge these edges one toward the other so that the weld is not weakened or destroyed.

By the use of the present invention, or the principle of operation disclosed, lengths of material of different gauge and any given width may be accurately and quickly formed into tubes having a truly circular shape without any tendency for the edges forming the seam to separate one from the other. The apparatus also adapts itself to use with material furnished in either relatively long or relatively short lengths.

I appreciate that many changes may be made in the construction and manner of operation disclosed and described herein without departing from the spirit or scope of my invention, and the appended claims are not limited to particulars not essential to the present invention.

I claim:

1. In a tube forming machine, a forming pass effective primarily on the edges of the material passing therethrough, a succeeding pass effective for excessively deforming the central portion of said material beyond the desired plane of such portion in the final tube and bringing said previously formed edges into adjacent relationship, a final roll pass for reshaping the deformed central portion of said material, and material guiding and holding means intermediate said passes.

2. In a tube forming machine, a forming pass effective primarily on the edges of the material passing therethrough, a succeeding pass effective for deforming the central portion of said material to produce a curved hump having substantially straight side walls substantially tangent to the curved portions of the hump and to the formed edges of the material, housings for said passes, and means for tying together all of said housings.

3. In a tube forming machine, a plurality of forming roll passes, means for adjusting each of the roll passes, and guiding means for the material being formed mounted intermediate adjacent roll passes, comprising stationary shoes grooved to receive the edges of the material.

4. In a tube forming machine, a plurality of forming roll passes, means for adjusting each of the roll passes, and guiding means for the material being formed mounted intermediate adjacent roll passes, said guiding means being disposed for cooperation with the extreme edge portions of the material intermediate adjacent passes, and comprising spaced, grooved shoes.

5. In a tube forming machine, a roll forming pass effective primarily on the edges of the material passing therethrough, a succeeding roll pass effective for deforming the central portion of said material to form an outwardly projecting hump having substantially straight side walls, and edge guiding means for the material intermediate said passes.

6. In a tube forming machine, a roll forming pass effective primarily on the edges of the material passing therethrough, a succeeding roll pass effective for deforming the central portion of said material to form an outwardly projecting hump having substantially straight side walls, and edge guiding means for the material intermediate said passes, there being common driving means for the rolls of all of said passes.

7. In a tube forming machine, a roll forming pass effective primarily on the edges of the material passing therethrough, a succeeding roll pass effective for deforming the central portion of said material to produce an outwardly projecting hump having a radius of curvature substantially less than the radius of curvature of the final tube, and having substantially straight side walls, and edge guiding means for the material intermediate said passes.

JAMES L. ADAMS, JR.